United States Patent [19]
Buckley

[11] Patent Number: 5,673,367
[45] Date of Patent: Sep. 30, 1997

[54] METHOD FOR NEURAL NETWORK CONTROL OF MOTION USING REAL-TIME ENVIRONMENTAL FEEDBACK

[76] Inventor: Theresa M. Buckley, 424 Homer Ave., Palo Alto, Calif. 94301

[21] Appl. No.: 307,388

[22] Filed: Sep. 15, 1994

Related U.S. Application Data

[63] Continuation-in-part of Ser. No. 955,107, Oct. 1, 1992, abandoned.

[51] Int. Cl.$^6$ ................................................. G06F 15/18
[52] U.S. Cl. ....................................................... 395/21
[58] Field of Search ............................... 395/22, 23, 24, 395/81, 94, 21; 364/167.01

[56] References Cited

U.S. PATENT DOCUMENTS

| | | | |
|---|---|---|---|
| 4,541,771 | 9/1985 | Beni et al. | 414/730 |
| 4,682,805 | 7/1987 | Reynolds | 294/86.4 |
| 4,730,861 | 3/1988 | Spencer | 294/86.4 |
| 4,766,322 | 8/1988 | Hashimoto | 250/561 |
| 4,850,631 | 7/1989 | Dotsko | 294/86.4 |
| 4,852,018 | 7/1989 | Grossberg et al. | 395/94 |
| 4,884,216 | 11/1989 | Kuperstein | 395/94 |
| 4,990,838 | 2/1991 | Kawato et al. | 395/81 |
| 5,063,492 | 11/1991 | Yoda et al. | 364/167.01 |
| 5,113,482 | 5/1992 | Lynne | 395/23 |
| 5,124,918 | 6/1992 | Beer et al. | 364/424 |
| 5,136,687 | 8/1992 | Edelman et al. | 395/22 |
| 5,253,329 | 10/1993 | Villarreal et al. | 395/24 |
| 5,259,064 | 11/1993 | Furuta et al. | 395/22 |
| 5,355,435 | 10/1994 | DeYong et al. | 395/24 |
| 5,371,834 | 12/1994 | Tawel | 395/23 |
| 5,420,964 | 5/1995 | Sugasaka et al. | 395/23 |

OTHER PUBLICATIONS

Eisley, A learning architecture for control based on back-propagation neural networks, IEEE International conference on neural networks, pp. 587–594 Jul. 27, 1988.

Kozakiewicz et al., Calibration analysis of a direct drive robot, IEEE International workshop on intelligent robots and systems, pp. 213–220 Jul. 6, 1990.

Yee et al., Network for Kinematics problem in parallel manipulator, 1991 IEEE International conference on neural networks, pp. 1699–1704 Nov. 21, 1991.

Pourboghart., Neural networks for learning Inverse-Kinematicsof redundant Manipulators, Proceedings on the 32nd midwest symposium on circuits and systems, pp. 760–762 Aug. 16, 1989.

(List continued on next page.)

*Primary Examiner*—Robert W. Downs
*Assistant Examiner*—Sanjiv Shah
*Attorney, Agent, or Firm*—James J. Leary; Leary, Titus & Aiello

[57] ABSTRACT

A method of motion control for robotics and other automatically controlled machinery using a neural network controller with real-time environmental feedback. The method is illustrated with a two-finger robotic hand having proximity sensors and force sensors that provide environmental feedback signals. The neural network controller is taught to control the robotic hand through training sets using back-propagation methods. The training sets are created by recording the control signals and the feedback signal as the robotic hand or a simulation of the robotic hand is moved through a representative grasping motion. The data recorded is divided into discrete increments of time and the feedback data is shifted out of phase with the control signal data so that the feedback signal data lag one time increment behind the control signal data. The modified data is presented to the neural network controller as a training set. The time lag introduced into the data allows the neural network controller to account for the temporal component of the robotic motion. Thus trained, the neural network controlled robotic hand is able to grasp a wide variety of different objects by generalizing from the training sets.

17 Claims, 7 Drawing Sheets

OTHER PUBLICATIONS

Chen et al., Learning control with neural networks, Proceedings: 1989 International conference on robotics and automation, pp. 1448–1453 May 19, 1989.

Yeung et al., Using a context sensitive learning network for robot arm control, Proceedings of the 1989 International conference on robotics and automation, pp. 1441–1447 May 19, 1989.

Kirchner et al., A perturbation approach to robot calibration, International Journal of robotics research, pp. 47–60 1987.

Josin et al., Robot control using neural network, ICNN, pp. 635–631 Jul. 27, 1988.

Kozakiewicz et al., Partitioned neural network architecture for Inverse Kinematics calculation of a 6 dof robot manipulator, IEEE International joint conference on neural network, pp. 2001–2006 Nov. 21, 1991.

Takanashi, 6 d.o.f. manipulators absolute positioning accuracy improvement using a neural network proceedings of the 1990 IEEE International workshop on intelligent robots and systems, pp. 635–640 Jul. 6, 1990.

Guez et al., Solution to the inverse kinematics problem in robotics by neural networks, IEEE International conference on neural network, pp. 617–624 Jul. 28, 1988.

Kuromatsu et al., Autonomous trajectory generation of a biped locomotive robot, 1991 IEEE International joint conference on neural networks, pp. 1983–1988 Nov. 21, 1991.

Bullock et al., A self–organizing neural network model for redundant sensory–motor control, motor equivalence, and tool use, IJCNN International joint conference on neural networks, pp. 91–96 Jun. 11,1992.

Gardner et al., Applications of neural network for trajectory control of robots, %th International conference on advanced robotics, pp. 487–492, vol. 1 Jun. 22, 1991.

S. Srinivasan, Robert E. Gander, and Hugh C. Wood; "A Movement Pattern Generator Model Using Artificial Neural Networks"; *Biomedical Engineering;* Ju. 1992; pp. 716–722.

Roselle Anderson and Adarsh Bhat; "Virtual Reality Mind-Games and Sense Alteration"; *Stanford Star;* May 1992; p. 8.

Cecilia Tom; "Bionic Limb Technology may be a Decade Away"; *The Stanford Weekly;* Jul. 19, 1990; p. 5.

Maureen Caudill; *Naturally Intelligent Systems;* 1990, pp. 250–255.

William F. Allman; *Apprentices of Wonder;* 1989, pp. 136–137.

Gardner et al, "Applications of Neural Networks for Trajectory Control of Robots", 5th Int'l Conf on Advanced Robotics, Jun. 19–22, 1991, pp. 487–492 vol. 1.

Buckley, "Neural Network Motion Control Status", Aug. 4, 1989.

Buckley, "Neural Network Motion Control Example", Aug. 25, 1989.

Elsley, "A Learning Architecture for Control Based on Back–Propagation Neural Networks", IEEE Inter Conf on Neural Networks, Jul. 24–27, 1988, pp. 587–594.

Kuperstein et al, "Neural Controller for Adaptive Movements with Unforseen Payloads", IEEE Transactions on Neural Networks vol. 1 No. 1 Mar. 1990, pp. 137–142.

METHOD FOR NEURAL NETWORK CONTROL OF MOTION USING REAL-TIME ENVIRONMENTAL FEEDBACK

RELATIONSHIP TO OTHER APPLICATIONS

This patent application is a continuation-in-part of patent application, Ser. No. 07/955,107 filed Oct. 1, 1992 now abandoned, the specification of which is hereby incorporated by reference in its entirety.

Government Rights

This invention is related to invention disclosures made by the inventor at NASA—Lyndon B. Johnson Space Center, Houston, Tex. The United States government may have certain rights to use this invention.

FIELD OF THE INVENTION

This invention relates to a method for neural network control of robotic motion. More particularly, it relates to a method for controlling the grasping function of a robotic hand.

BACKGROUND OF THE INVENTION

Robots and other automatically controlled machinery are playing an increasingly important role in our industry, our economy and our society. Robots can be used to replace human labor in tasks that are dull and repetitive or they can be used to perform tasks requiring extreme precision, speed or strength which is beyond human capabilities. Another beneficial use of robots is for performing tasks which are too dangerous for humans or for operating in extreme or hostile environments that would be a risk to human life. Tasks that fall into this category include such things as extravehicular space activities, warhead disarmament and disposal, manipulation of radioactive wastes, and data gathering within active volcano craters.

Other beneficial applications for robotics technology include medical applications as robotic-controlled prostheses for replacing the functions of amputated or nonfunctional limbs or as robotic-controlled orthoses that act as an "exoskeleton" for controlling the movements of limbs that have been paralyzed or atrophied. Such robotic prostheses and orthoses can be used to assist the disabled in ambulation, grasping and manipulation of objects and other essential tasks. Other medical application include robotic surgical instruments for performing microsurgery or retrieving intraluminal thrombus or emboli in blood vessels.

A technology that has developed hand-in-hand with robotics and automatic control is artificial intelligence. Artificial Intelligence technology, or AI for short, refers to the use of digital computers to mimic the cognitive and symbolic skills of humans. When the principles of artificial intelligent are applied to robots or automated machinery their usefulness is increased to an even greater degree. AI allows robots or automatic machines to be programmed to perform complex tasks, to react to external inputs and even to perform rudimentary decision making. AI, however, has its limitations. Even AI controlled robots are still unable to react to new changes in their environment that do not match with their preprogrammed operating parameters. Even if they have been programmed to recognize and react to hundreds or even thousands of different situations, they cannot generalize from their programmed knowledge to react to unforeseen circumstances. These unforeseen situations usually require human intervention to correct the problem by restoring the expected conditions or by reprogramming the robot to recognize and react to the new situation. This inability of robots and automatic controllers to react to unforeseen circumstances or changes in their environments has been one of the impediments to applying robots to many of the possible industrial and medical applications where they could be of benefit.

Neural network controllers offer one possible solution to this limitation of current robotics and artificial intelligence systems. Neural networks are a type of data processing system whose architecture is inspired by the structure of the neural systems of living beings. Unlike the serial connections of the digital computers used for AI systems, neural networks are highly interconnected with variable weights assigned to each of the interconnections. Their architecture allows neural networks to actually learn and to generalize from their knowledge. Therefore, neural networks are taught or trained rather than programmed. Some neural networks are even capable of independent or autonomous learning, or learning by trial and error.

The ability of neural networks to learn and to generalize from their knowledge makes them highly useful as robotic controllers. A neural net controlled robot can be taught by taking it through a series of training sets, which present data typical of what the robot will see in operation. From these training sets, the robot can "generalize" to react properly to new situations encountered in actual operation, even if they do not exactly match the training sets from which they were taught. Some neural networks can be "self organizing", that is., they learn from these new situations and add it to the data learned from their training sets by adjusting the weights assigned to the interconnections between their processing elements or "neurodes." Two types of neural networks capable of self organizing are back-propagation networks and adaptive resonance networks.

While reference will be made to specific types of neural networks in the following description, it is not the intention of this specification to teach the design or architecture of neural networks, but to advance the application of neural network technology to robotics and automatic control technology. It should also be understood by the reader that the specific types of neural networks referred to are given by way of example and that other types of neural networks may also be used with the disclosed control method. For detailed information about the theory and design of neural networks, the reader's attention is directed to the following references:

1) Apprentices of Wonder, Inside the Neural Network Revolution by William F. Allman, Bantam Books 1989
2) Naturally Intelligent Systems by Maureen Caudill and Charles Buffer, The MIT Press 1990
3) Parallel Distributed Processing by James L. McClelland, David E. Rumelhart and the PDP Research Group, The MIT Press 1987

Volume 1 Foundations

Volume 2 Psychological and Biological Models

Discussion of the Prior Art

Certain attempts have been made to apply neural networks technology to robotic ambulation and other types of robotic motion. Two such examples are:

U.S. Pat. No. 5,133,482, granted to Lynne, for a Neural Network Model for Reaching a Goal State describes a modification to a back-propagation neural network used for controlling robot ambulation. Lynne modifies the back-propagation network by adding to it a "satisfaction index" which "rewards" the robot proportionally to how well it has optimized its path to the goal state. This encourages the robot to experimentally optimize its path until a sufficient satisfaction level has been reached. One of the stated advantages of this method is that it avoids the robot from being trapped in any "local minima" that would discourage it from further optimizing its path.

U.S. Pat. No. 5,124,918, granted to Beer et al., for a Neural-Based Autonomous Robotic System describes the use of a neural network combined with a pacemaker circuit for controlling the ambulation of a multi-legged autonomous robot. The system also includes tactile feedback sensors that allow it to model the stimulus-and-response behavior of a living being.

Tactile and position feedback have also been used with non-neural network robotic systems. Examples of these are:

U.S. Pat. No. 4,730,861, granted to Spencer, for a Finger Gripper with State Indicator describes a robotic gripper that uses a Hall-effect position sensor for indicating the closure state of the gripper.

U.S. Pat. No. 4,766,322, granted to Hashimoto, for a Robot Hand Including Optical Approach Sensing Apparatus describes a robotic gripper with seven optoelectrical proximity sensors to indicate the gripper's position with respect to the object to be picked up.

The inventor believes that these and all of the prior art robotic controllers could benefit from the application of the neural network robotic controller described herein.

OBJECTS AND ADVANTAGES

One of the disadvantages of the prior art neural network robotic controllers is that the learning and adaptation process is done iteratively by trial and error. While the ability to learn by trial and error is certainly a step forward in autonomous robot operation, it is less useful in real life situations than one might think. For instance, if a robot is instructed to perform an unfamiliar task that must be done right away, there is no time for the multiple iterations necessary for the standard neural network to adapt to the new situation. If the task is a dangerous one, then the "errors" inherent in the trial-and-error process might bring the learning process to an abrupt and untimely termination.

It is therefore an objective of the present invention to provide a method for the neural network robotic control with real-time adaptive capabilities. It is also an objective of the invention to provide the controller with instantaneous environmental feedback that allows the controller to sense and react to novel or changing environmental conditions. It is also an objective to provide the neural network with the capability to learn from the adaptive process, adding the novel situation to its previous database of known situations. It is an objective to accomplish this sensing, adaptation and learning process in real-time while successfully accomplishing a task without the need for repeated, unsuccessful iteration.

It is a further objective of the invention to apply this neural network robotic control method to the real-time adaptive motion control of a robotic end effector, such as a robotic gripper. It is an objective to provide the network with instantaneous environmental feedback from position, force, proximity and tactile feedback sensors for sensing and adapting to novel or changing environmental conditions.

It is a further objective of the invention to apply this neural network robotic control method to an anthropomorphized robotic end effector usable as a prosthesis or orthosis for replacing or assisting the function of an amputated, paralyzed or atrophied limb. It is an objective to provide the network with means for control input from the user to initiate movement of the prosthesis or orthosis while the neural network controls the coordination and adaptation of the motion.

It is also an object of the invention to provide a method of initially training the neural network robotic controller through simulation of training sets that emulate data typical of that which the robot will encounter in operation, thereby eliminating the need for initial trial-and-error training by the operator of the robot or robotic prosthesis or orthosis.

SUMMARY

In the disclosed method, a robot or other automated machinery is provided with a neural network controller capable of processing information and formulating a control response which governs the actions of the robot. The neural network receives input from environmental feedback sensors that indicate the state of the robot; this information is used in formulating the robot's response to environmental factors. The neural network may also receive control input from an external source which governs its actions or initiates the performance of a task. Preferably, a back-propagation neural network controller is used so that the input from the environmental sensors can be added to any data previously taught to the neural network, thereby increasing the network's database of known conditions. The neural network is initially taught or trained by a series of training sets which represent data typical of what the robot will experience in actual operation. The network can be trained by trial and error, or by physically moving the robot through the series of training sets, or the network can be taught by simulation using a computer or specially made "black boxes" to emulate the robot and its environment. The training sets are learned by the neural network by adjusting the weighting functions on the interconnections between its processing elements or neurodes. Like in standard neural networks, the data from these training sets serves as a basis for the robot to operate and perform tasks within its environment. The data is also used as the basis for the robot to generalize from its knowledge when facing new situations that do not map exactly into the data from its training sets. Unlike standard neural networks, however, in the current invention the data derived from the training sets is not necessarily stored as a series of complete trajectories that the neural network controller must choose from or improvise from in a trial-and-error method. The data, instead, is incrementalized into discrete time segments that represent "snapshots" of the robotic motion at different points in time. A mapping is formed between the robot's operating parameters and the sensed environmental conditions at each discrete increment of time. The set of incrementalized input data is then lagged one increment of time behind the incrementalized operating parameter data to form a new data mapping. The new mapping represents discrete point-to-point cause-and-effect mappings between the environmental input data and the robot's operating parameters. This point-to-point data mapping is remembered by the neural network as different weightings on its neural interconnections and used to construct complete trajectories that may be used by the robot in the performance of a task.

Several important advantages accrue from this incrementalization of the data and forming it into discrete point-to-point cause-and-effect mappings. First of all, the number of initial trajectories available to the controller is increased by the ability to combine the increments of motion learned from the training sets. Thus, complicated motions can be taught to the neural network with a reduced number of training sets because the network has a greater ability to generalize.

Second, the learning process for the controller can also take place in discrete time increments in a real-time adaptive fashion without interruption or undue time delay of the task at hand. This is in marked contrast to many of the prior art methods that, when they encounter an error in the trial-and-error method, must start over at the beginning of the task. This distinction is very important in robots that are intended to operate in the real world, not merely as curiosities or academic exercises limited to the AI laboratory. While small, adaptive midstream corrections may be tolerated and even beneficial in an unfamiliar task performed by a robot in an industrial or medical environment, stopping and starting over from the beginning of the task iteratively until the robot had adapted to the new task might be inviting disaster. The advantage of using a back-propagation or other self-organizing neural network for this control method is that the robot will learn from the corrective process just described and adapt itself to the new conditions, gaining a sort of coordination that can be used when the same or similar conditions are encountered again.

One of the most important advantages of the control method of the present invention is that the real-time adaptive response to environmental feedback allows the robot to adapt to changing environmental conditions. Prior art methods such as the Neural Network Model for Reaching a Goal State described above can adapt to changes in environmental conditions by iteratively readapting themselves to the changed environment. They lack, however, any means to sense and adapt to changes in the environmental conditions as they happen. The present invention, on the other hand, allows the robot to instantaneously react to the changing environment detected by its environmental feedback sensors and adjust its trajectory in real time to accomplish its task without interruption. Likewise, this adaptability allows the robot to react to midstream changes in its goal state. The importance of this feature will become apparent from the examples described below.

The present invention employs neural networks to simulate and provide real-time adaptable hand motion via a mapping between a robot and its environment. This is accomplished by dividing the experience of the robot into small time increments. Each increment is compared to the increments the robot has previously encountered, for example, in training. Thus the new environment need not be identical, or even similar, to a training environment, as long as each time increment is small enough to encompass only known relationships.

During each time increment, the sensors of the robot gather information about the environment. This information is then incorporated into the robot's action during the next time step. In this way, the action of the robot becomes better and better suited to the environment, even if the environment changes during the encounter. For example, if the task is to pick up an oddly shaped rock, the robot according to the present invention can accomplish the task even if the rock is rolling down a slope with a changing direction and velocity. A rigidly preprogrammed robot would continue on its original course, reaching for a rock that was no longer there.

DETAILED DESCRIPTION OF THE INVENTION

Figure 1:
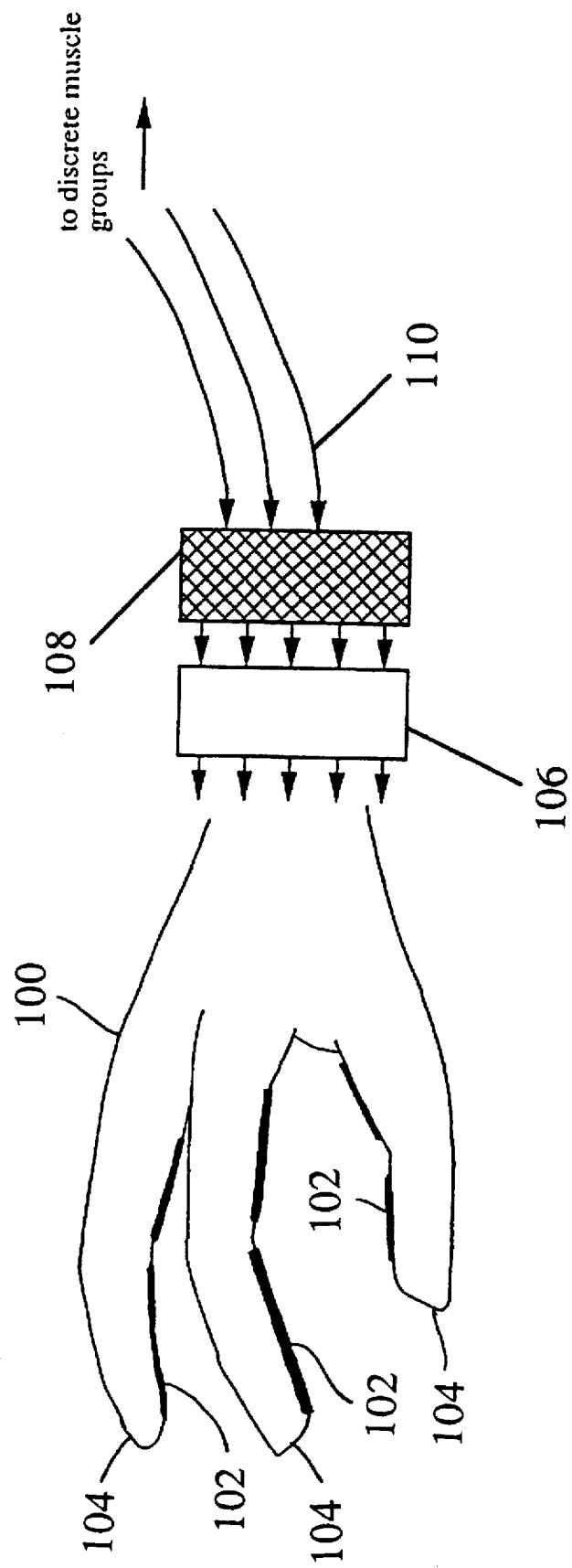
FIG. 1 shows a prosthetic hand which uses the neural network control method of the present invention.

FIG. 1 shows a diagram of an anthropomorphic prosthetic hand 100 which uses the neural network control method of the present invention. The prosthetic hand 100 is made with environmental feedback sensors 102 on each finger joint 104. The feedback sensors 102 include proximity sensors and force sensors. The prosthetic hand 100 is operated by drive motors 106 to create the grasping motion of the prosthesis. The drive motors 106 are controlled by an electronic neural network 108. The electronic neural network 108 receives control input, for instance, myoelectric control signals 110, from muscle groups in the user's arm. The electronic neural network 108 also receives feedback signals from the sensors 102 in the prosthesis indicating the grasping state of the hand 100. The neural network 108 uses a novel motion control method to achieve controlled grasping motion of the prosthetic hand 100 using real-time environmental feedback.

This is just one example of the possible uses of the present invention. The neural network control method can be used for motion control in other types of prostheses. For example, it can be used for gait control in motorized prosthetic legs. The neural network control method can also be used to control robotic grippers or other robotic end effectors or for controlling other kinds of machine motion.

Figure 2:
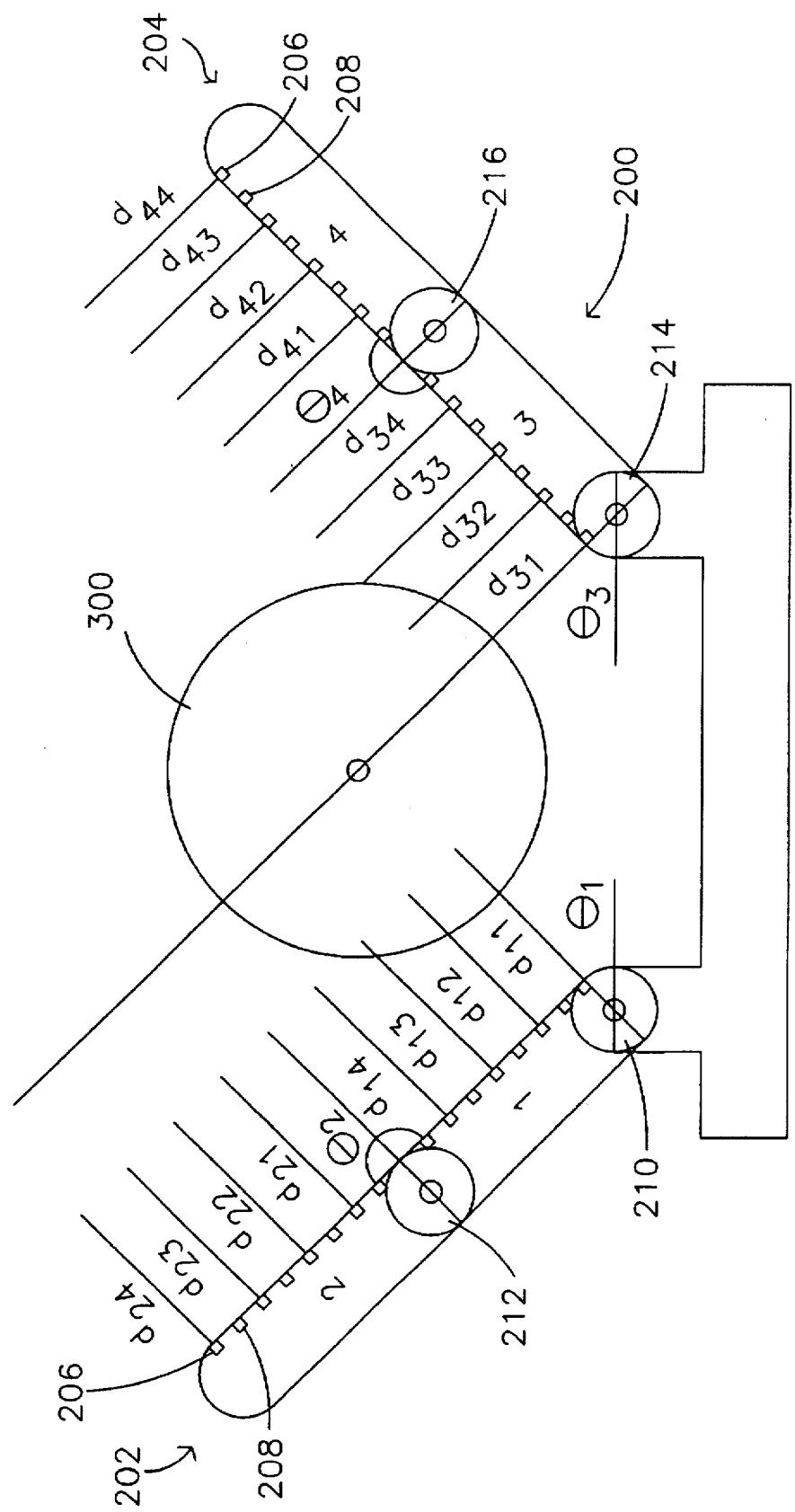
FIG. 2 shows a two-finger robotic hand used to model the present invention grasping a round object.

A simplified model of a two-finger robotic hand 200 was used to demonstrate the neural network control method. FIG. 2 illustrates the robotic hand model 200 that was used in a simulation of the control method. The robotic hand 200 has two fingers 202, 204, with two rotating joints 210, 212, 214, 216 in each finger. Each segment 1, 2, 3, 4 of the fingers 202, 204 in this model is equipped with feedback sensors, including four proximity sensors 206 and four force sensors 208, for a total of thirty-two feedback sensors. Drive motors (not shown) control the angles $\theta_1 \ldots \theta_4$ between the finger segments 1, 2, 3, 4. Because of space limitations, the drive motors can be located external to the robotic hand 200 and connected to the joints with cables or other actuators. The neural network controller receives control input from the user and combines these with feedback signals from the sensors to derive appropriate control signals which are sent to the drive motors.

A computer simulation of the robotic hand was used to demonstrate the neural network control method. The robotic hand was simulated using TOPAS, Three Dimensional Object Processing and Animation Software from AT&T Graphics Software Labs. A FORTRAN program based on the back-propagation neural network algorithm from Parallel Distributed Processing by James L. McClelland, David E. Rumelhart, running on a VAX 8650 computer system was used to simulate the neural network controller. In a physical embodiment of the invention, the neural network controller could be implemented in hardware, rather than as a software model.

Figure 5:
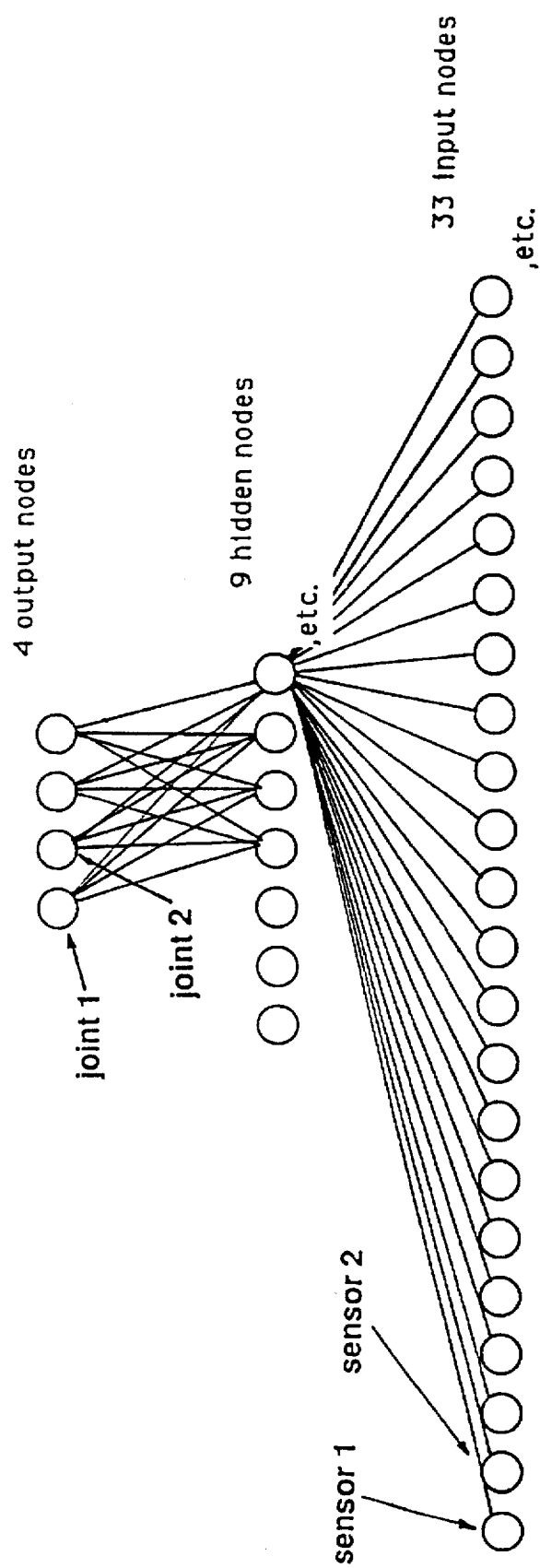
FIG. 5 shows a diagram of the neural network used to model the present invention.

The neural network which was used in the software model is shown diagramatically in FIG. 5. It is a three-layer neural network with an input layer, a hidden layer and an output layer. The input layer was defined as having 33 input nodes, one for each of the 32 feedback sensors, plus one input node whose output was always set at one to provide a learning bias. The hidden layer was given 9 hidden nodes. Each of the 9 hidden nodes was interconnected with each of the 33 input nodes. Only the connections between the input layer and one of the hidden nodes has been shown for clarity. The output layer was given 4 output nodes, one for each of the drive motors. Each of the output nodes was interconnected with each of the hidden nodes. Once again, only the connections between the output layer and four of the hidden nodes has been shown for the sake of clarity. The initial conditions of the neural net were established by randomly assigning a connection strength with values between 0 and 1 to each of the interconnections in the neural net. The neural network was then taught to control the robotic hand to grasp a variety of objects through the control method of the present invention which is described below.

The neural network is used to map a relationship between the input parameters, representing both the distance of an object from the potential contact points on the hand, as measured by the proximity sensors, and force of the hand on the object, as measured by the force sensors, to a set of control commands, representing what the next appropriate movement of joint angle, $\Delta\theta_n$, on each finger should be. Each mapping represents an interval in time, $\Delta t$. The sequential combination of each integral time step animates the hand to provide the resultant motion.

Figure 4:
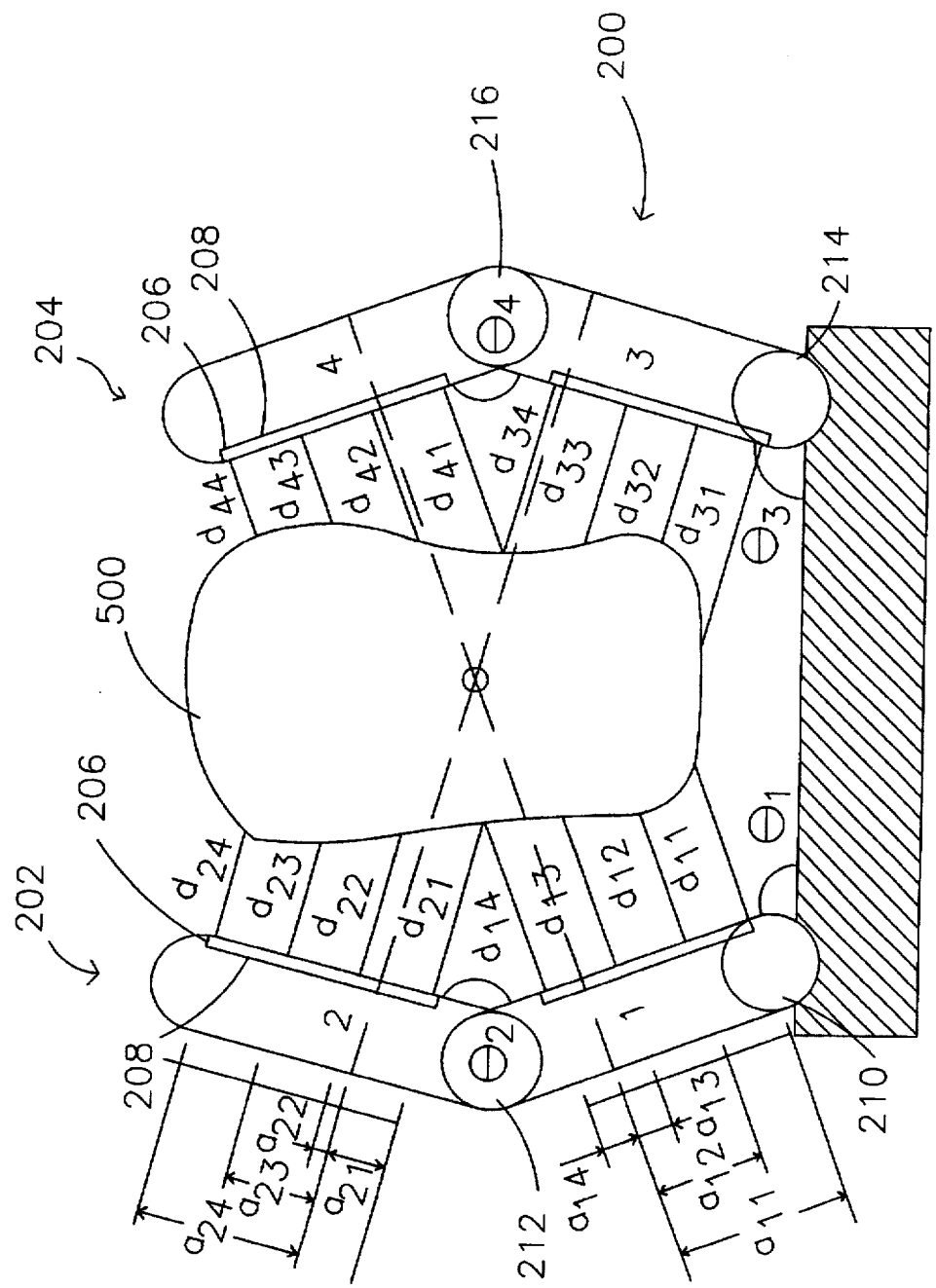
FIG. 4 shows the two-finger robotic hand grasping a very irregular object.

Referring again to FIG. 2, the angles $\theta_1 \ldots \theta_4$ are joint angles of each finger segment 1, 2, 3, 4. The distances $d_{12} \ldots d_{44}$ indicate the orthogonal proximity of each finger segment from the object 300 at a specific point in time. The distances $a_{12} \ldots a_{44}$ (see FIG. 4) provide an indication of moment about the object's centroid.

In the most general sense, the relationship to be mapped out can be symbolically described by:

$$\Delta\theta_{n+\Delta t} = f(d_{12} \ldots d_{44}, a_{12} \ldots a_{44}, \text{etc.})_t$$

prior to contact. Once contact is made, forces, $f_{12} \ldots f_{44}$, can be included in this list of parameters for the final stage of motion until an appropriate grasp stopping point is signaled.

Learning is accomplished in the following fashion. In neural network terminology, for a given network configuration, teaching the network to perform a desired task requires training. The neural network is trained by presenting it with training sets. These training sets can be created in a number of ways. The actual robotic hand can be moved manually through a gripping motion by applying outside force or by manually controlling the drive motors and recording the sensor feedback ($d_{12} \ldots d_{44}, f_{12} \ldots f_{44}$) and the joint angles ($\theta_1 \ldots \theta_4$) throughout the trajectory. Alternatively, one might use a tool, such as a prehensor instrumented to provide proximity, force feedback and position sensing, to trace the motion of the fingers and quantify the relationship between the hand and the object. Using the prehensor or another master, an object could be grasped using the finger movements, or motion, desired and this data would be recorded. Another approach to creating training sets is through simulation, either through animation of the training sets, as in this example, or by hooking a "black box" or other simulator to the neural network to simulate the motion of the robotic hand in the training sets.

The data that is collected is then divided into time increments, $\Delta t$, or snapshots of motion. Next, force and proximity data at each time increment are shifted out of phase to lag one step in time behind joint position (or angular movement data). Data at each time interval, $\Delta t$, constitutes a specific pattern. The resultant set of input (proximity and force in this case) and output (prediction of next angle of movement) patterns over all the time increments, $\Delta t$, constitutes a training set. This process can be designed to include other objects in the training set. Using this training set, the network is then taught to map this cause and effect relationship between force and proximity feedback and the next desired change in joint angle for each finger. Hence, an animatable sequence is created and motion is learned.

This method is in marked contrast to the prior art methods which use static patterns as training sets for neural networks to perform such tasks as optical character recognition where there is no temporal component of the data represented. These prior art methods do not generalize well to control situations which require the controller to account for motion or other time-related phenomena. The time lag introduced into the training sets in the present invention allows the neural network controller to create a cause-and-effect mapping that accounts for time-related phenomena such as machine motion.

Using this method, the robotic hand model of FIG. 2 was used to create training sets of grasping sequences using a round object 300. The animated robotic hand 200 was manually taken through the grasping sequence from a starting position of approximately 45° as shown and the data were recorded. The grasping motion was divided into multiple increments of time, $\Delta t$. The sensor feedback data ($d_{12} \ldots d_{44}, f_{12} \ldots f_{44}$) were shifted out of phase to lag one step in time behind joint position data ($\theta_1 \ldots \theta_4$) by one time increment, $\Delta t$. This new data set was presented to the neural network program as a series of training sets. Each time a training set was presented to the neural network, the program reset the weights of the interconnections between each of the nodes using the back-propagation algorithm. Training sets were presented to the neural network until the output of the network converged to an acceptable error level.

Figure 3:
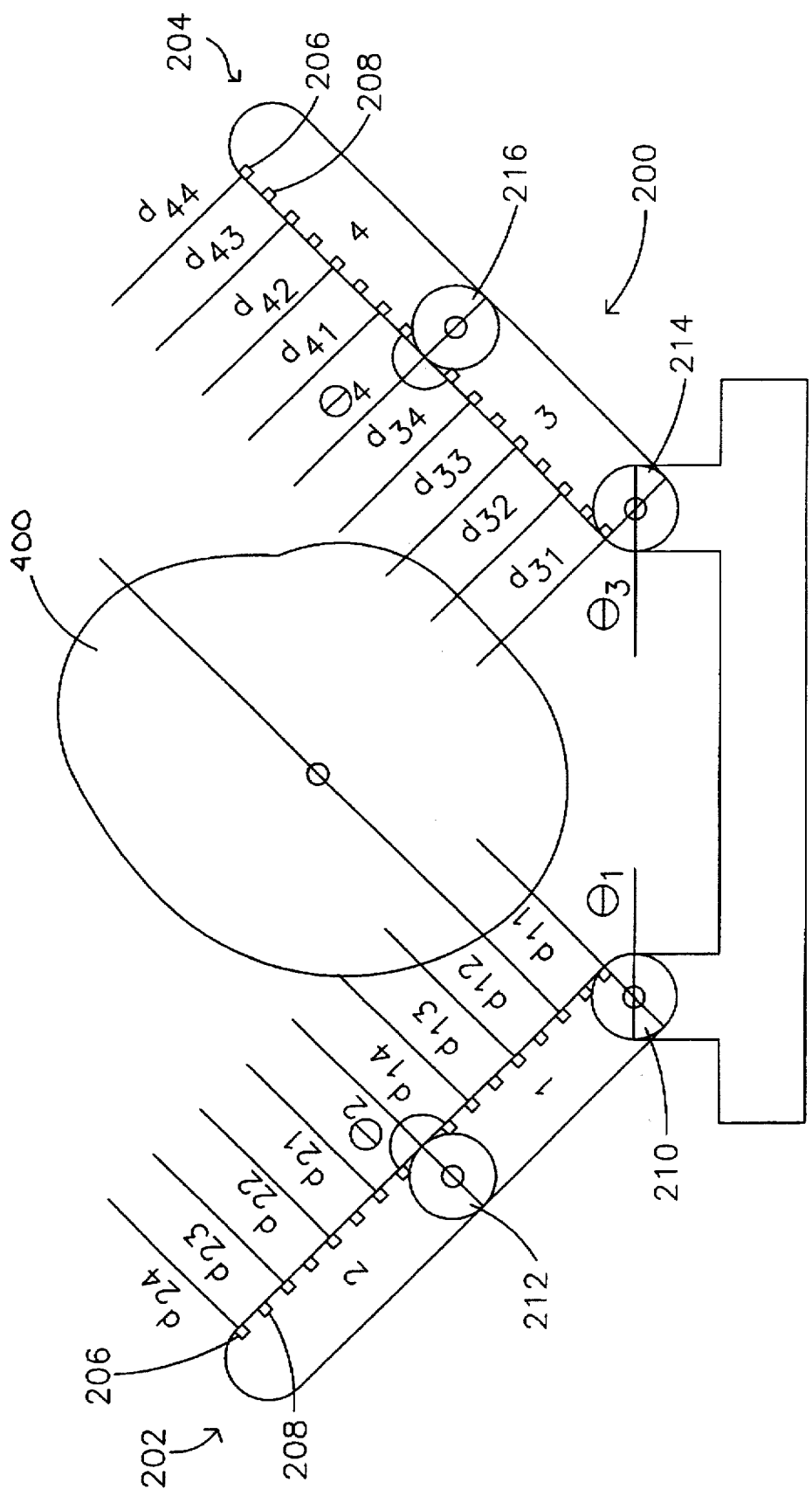
FIG. 3 shows the two-finger robotic hand grasping a slightly irregular object.

To test the learning of the neural network, the robotic hand 200 was then presented with a slightly irregular object 400, as shown in FIG. 3. Based on the sensor feedback data ($d_{12} \ldots d_{44}, f_{12} \ldots f_{44}$)$_{t=0}$ the neural network predicted the next increment of joint angular position ($\Delta\theta_1 \ldots \Delta\theta_4$)$_1$ needed to close the robotic hand on the slightly irregular object 400. The two fingers of the robotic hand 202, 204 were moved according to the predicted amounts. (In a physical embodiment, this would be accomplished by sending appropriate control signals to the drive motors to effect the incremental movement.) Then the new position of the fingers relative 202, 204 to the object 400 ($d_{12} \ldots d_{44}, f_{12} \ldots f_{44}$)$_{t=1}$ were used by the neural network to predict the next incremental movement ($\Delta\theta_1 \ldots \Delta\theta_4$)$_2$ needed. This process was repeated iteratively until the hand closed around the object 400. This showed that the neural network was able to generalize from the training set based on a round object to the test set which had a slightly irregular object. Other examples were tested using highly irregular objects 500, such as the one illustrated in FIG. 4 and, once again, the neural network was able to generalize to the more complex test situation based on a very simple learning set. The original learning sets can be augmented by using the data from the test situations as additional training sets. Thus, the neural net would add these training sets to its collection of "learned" situations.

This simulation shows how, using the method of the present invention, the neural network controller is capable of learning to control robotic motion and able to generalize from what it has learned in the training sets. Classic artificial intelligence methods are not capable of this self learning process. Also, prior art neural network controllers are not capable of predictively controlling motion or other time-related processes because their learning is based on static input data.

Figure 6:
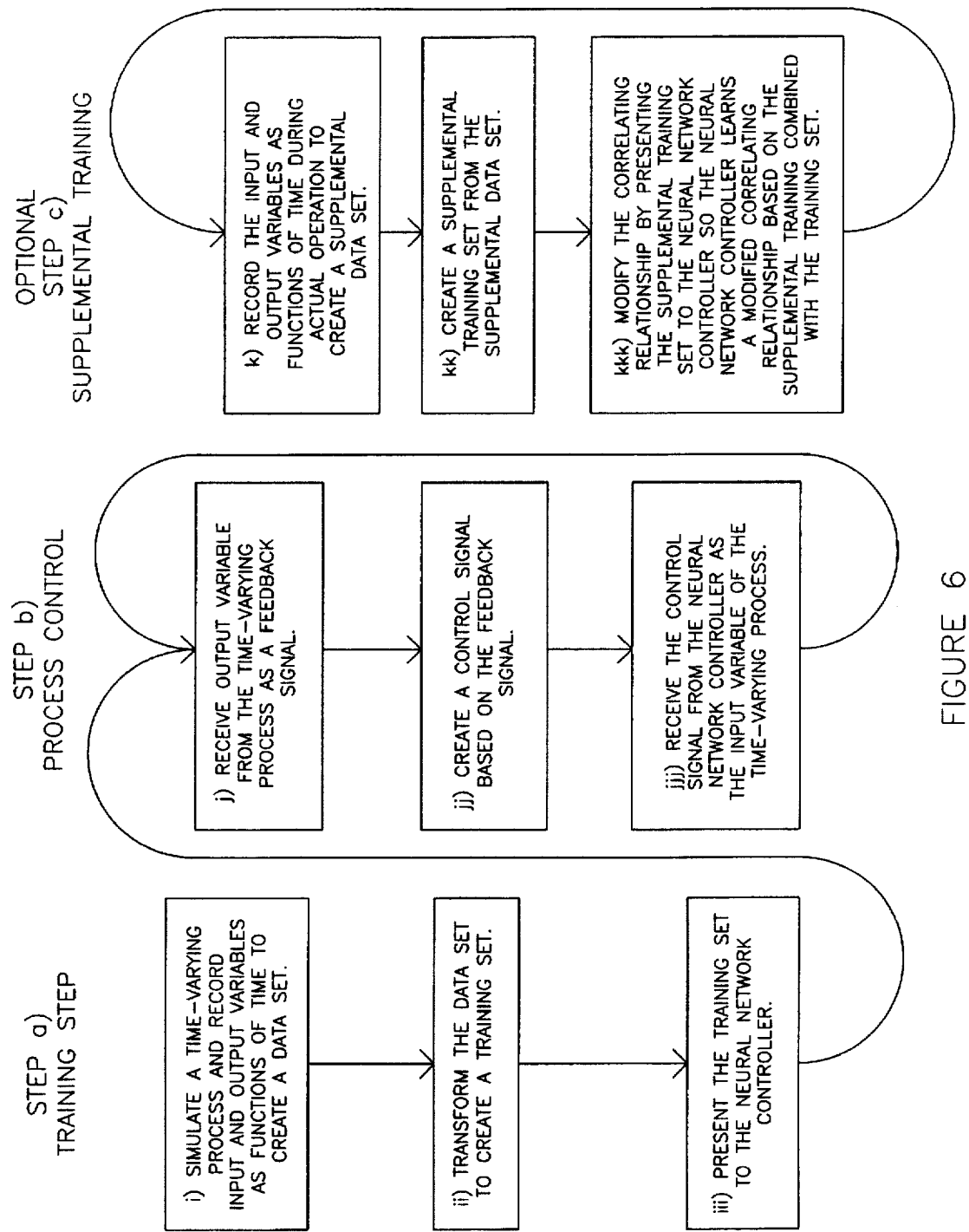
FIG. 6 shows a flow chart of the neural network control method of the present invention.

A flow chart is presented in FIG. 6 to help in understanding the neural network control method of the present invention. In Step a) of the method the neural network controller is trained off-line. The training Step a) involves the following substeps: Step i) simulating a time-varying process, such as the gripping motion of the robotic hand described in relation to FIGS. 2, 3 and 4 above, and recording an input variable as a function of time and recording an output variable as a function of time to create a data set that includes both input variable data and output variable data as a function of time. This step can be performed in a number of ways: by manually moving the robotic end effector through the movement, by using open loop control to move the robotic end effector, by a black box simulation or by simulating the movement with a computer programmed to produce the necessary control and feedback dam. Step ii) transforming the data set to create a training set by dividing the data set into increments of time and shifting the output viable data out of phase with the input variable data so that the output variable data lag at least one time increment behind the input variable data. This transformation step introduces the necessary time component into the training set. Step iii) presenting the training set to said neural network controller so that the neural network controller learns a correlating relationship between the output variable and the input variable based on the training set. This step can be done by back-propagation learning methods or other neural network learning methods. Now the neural network has been trained for the process control function which occurs in Step b). The control Step b) involves the following substeps: Step j) receiving the output variable from the time-varying process as a feedback signal in the neural network controller. Step jj) creating a control signal based on the feedback signal in accordance with the correlating relationship learned by the neural network controller from the training set. Step jjj) receiving the control signal from the neural network controller as the input variable of the time-varying process. Because the neural network controller is able to generalize from the training set data, it is able to control the robotic end effector in situations that may differ somewhat from the training set presented.

Although the preferred method of the invention is to use the trained neural network controller in closed-loop feedback control, as described above, the method can also be used for open-loop control. In this case, the neural network can be trained as above, substituting the output variable or the feedback signal with a time indication variable. The robot trajectory or the process is run against time and the input variable and the time indication variable are recorded as a function of time to create a data set with the time indication variable substituted for the output variable. The transformation step and the learning step are then performed as described above. After the neural network training is complete, the process control step is performed using the time indication variable as the only feedback signal. Essentially, this creates an open-loop controller with a neural network that has been trained in a way that accounts for the time variable in a time-varying process.

From this point forward, the neural network controller can perform the control function purely from the correlating relationship learned from the training set or sets. This is generally sufficient when the training sets fairly represent the situations that the robotic end effector or other process will encounter in operation and where the operating conditions are reasonably predictable. For applications where the robotic end effector or other process will encounter diverse or changing operating conditions, the initial training can be supplemented by allowing the neural network controller to continue to learn from some or all of the situations encountered during actual operation. If this is desired Step b) can be followed by a supplemental training step c) which includes the following substeps: Step k) recording the input variable as a function of time and recording the output variable as a function of time during the actual operation of the time-varying process to create a supplemental data set, which includes both supplemental input variable data and supplemental output variable data as a function of time. Step kk) creating a supplemental training set from the supplemental data set by dividing the supplemental data set into increments of time and shifting the supplemental output variable data out of phase with the supplemental input variable data so that the supplemental output variable data lag at least one time increment behind the supplemental input variable data. Step kkk) modifying the correlating relationship by presenting the supplemental training set to the neural network controller so that the neural network controller learns a modified correlating relationship between the output variable and the input variable based on the supplemental training combined with the training set. In this way the neural network controller can continue to generalize from the supplemental training set combined with the initial training set so that the controller will learn to react to new operating conditions or new situations encountered during operation that were not represented in the original training set.

Figure 7:
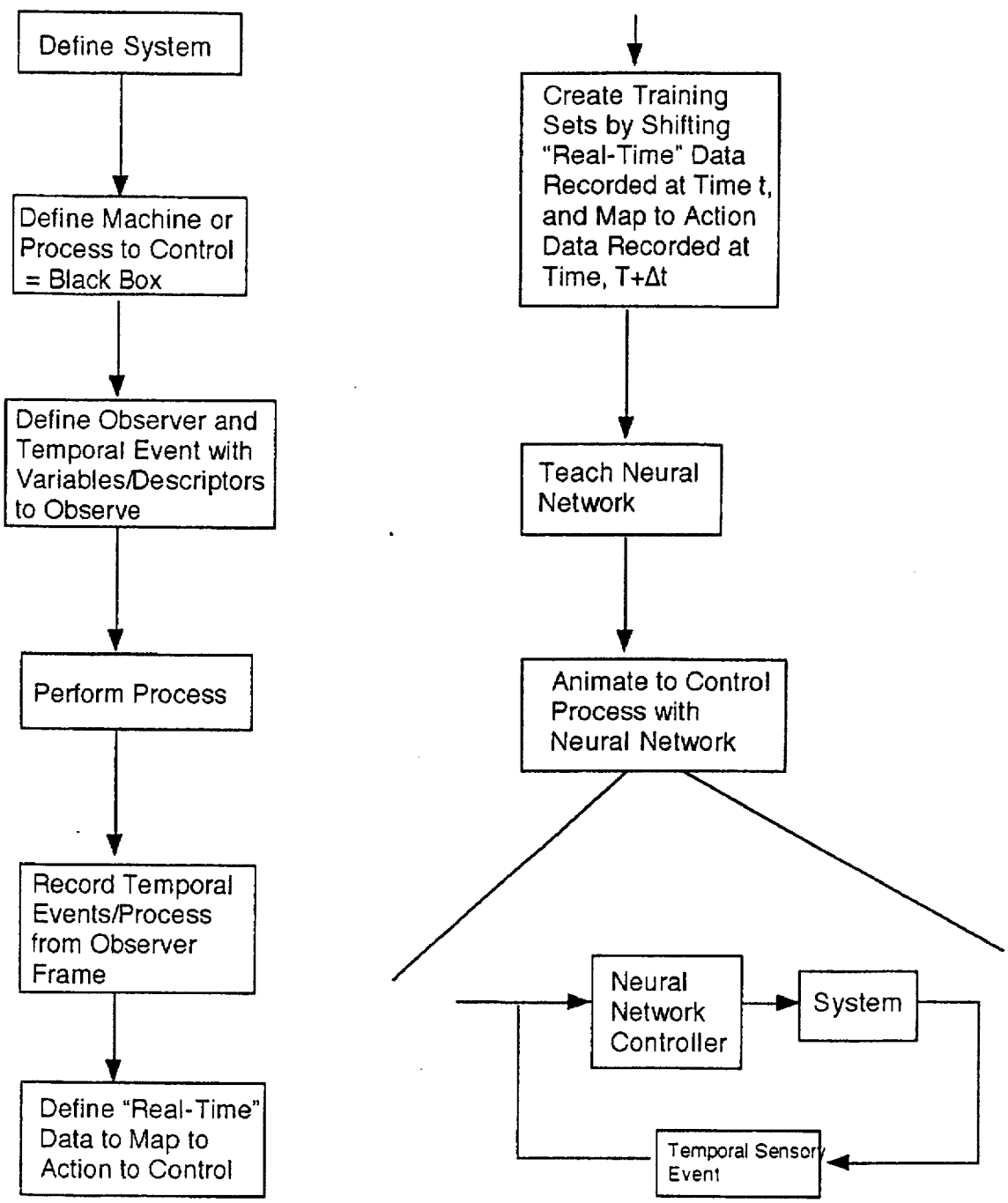
FIG. 7 shows a flow chart of an alternate embodiment of the neural network control method of the present invention.

This same technique described herein can be used to observe, learn and control any nonrandom process in space or time. The neural network is used, almost as a retrovirus in biology, to learn and reproduce or control a system's innate intelligence. The intelligence that is captured by the neural network might be captured from a human operation, a computer simulation, a biological system or from classical controller technology. FIG. 7 shows the step by step method for tapping a dynamic system's knowledge then converting this knowledge into an intelligent, predictive artificial neural network (or controller), either of a hardware or software type.

They key to capturing a system's mate knowledge is to identity and choose variables within a given system's environment that change in time and that uniquely describe the process to an observer. Time, itself, may be one variable used. The ability of the neural network to generalize will be a function of the range of "solutions" presented to it during training. Accurate generalization requires a convergent system and its accuracy is enhanced by choosing training sets at sufficient intervals and at solution points that represent the outermost bounds of future conditions the neural network will encounter during its use.

Three examples of this technique, following the outline of FIG. 7, are given. The first involves selective neural network replacement of microprocessor control, the second involves control of a fixed trajectory and the third involves intelligent control of medical therapies.

Microprocessor Control:

For this example, one or more neural networks might be made available within the framework of a personal computer for running a repetitive, yet time intensive computational program. The user would use a neural network to store a representation of the intelligence the computer uses to perform the computations required by the program of interest. Once trained, the network could be called upon to perform the same computations that the program does, but at much greater speed.

To train the network, the user would run the given program many times, each time using a different data set representative of the range of future data sets the program might expect to perform computations on. With a broad enough range of inputs presented by the user, the neural network could be taught to learn the binary representation of the program input data and the program output data, the latter extracted at the end of the program run.

Using the guidelines of FIG. 7, the first step is to define the boundaries of the observer, the system and the black box that will be replaced with a neural network controller. In all cases, the observer can be thought of as the equivalent of a data sheet that records events occurring in the system during real-time. The observer has its own, running clock. In this example, the observer is an electronic or software device that records the contents of the input and output of the CPU data registers (binary numbers) at the start of the program and at a time, Dr, later when the contents include the resultant program output. In this case, the temporal event only represents one step in time. Time 1 corresponds to the time that input data is in a given CPU data register and time 2 refers to a time, Dr, later after the program has completed its computations on that data set. In this case, one could observe the input and output contents of the CPU data registers at the start and end of a particular program run. The black box to be replaced by the neural network controller is the CPU. The observer might be a software or hardware storage device within the computer. The boundaries of the system include the personal computer and user less the digital input and output data registers of the CPU and the training data storage device of the observer. Within this system, the black box that will be replaced by a neural network is the CPU itself. Analog to digital converters and all other translation devices within the computer will still be used.

An additional run of the program, using a different set of input values, would be like collecting data on a new trajectory in the motion control example described herein. Each program run would be used to generate a new training set for the neural network. Each training set would consist of the binary input dam in the CPU data register at time 1 and the binary output data in the CPU data register at a time, Dt, later at the end of the program ran. With enough training sets, and with input data carefully chosen to fully describe the process, the network can be taught to perform the computations that were originally performed, line-by-line, by the program, and the computer's CPU. Once trained, the neural network could be presented new input data (the analogous "real-time environmental feedback"), the CPU controller could be bypassed, and the neural network would output the binary resultant of the computations of this particular, leaned program. This binary output would feed into the computers intact translation and D/A converter devices of the original pathway. Several modules could be set aside for off-loading several different programs to enhance the computer's overall efficiency.

One might draw the analogy that this example is similar to using a neural network to interpolate a solution from a predetermined matrix of solutions. Although a look-up table can be used to perform this same task, such a search and retrieve process followed by a software interpolation routine is believed to be more computation and time intensive. Additionally, interpolation inherently assumes that the system represented is linear. Therefore, it is expected that non-linear systems will require a more extensive look-up table, increasing the storage space required and the search process performed during an interpolating routine.

Control of a Fixed Trajectory:

FIG. 7 shows a multi-segmented arm with end-effector that might be used to perform a repetitive, industrial process. In this case, the arm might be used to pick up a fixed size of an object at a particular location during a manufacturing or assembly process. Real-time feedback of variables in space may not be needed, and one might only desire the ability to rapidly teach an arm to perform a new process or task. In this example, time, itself, is chosen as one environmental variable that is observed to change and provides the only "real-time" environmental feedback. The additional variables that are observed to change are rotational angles at each arm joint. The arm could be guided through a desired trajectory (manually, via simulation, via other control systems) and the time and joint angles could be recorded throughout the process. The training set would consist of the time, shifted one step back in time, mapped to the joint angles. Only one trig set would be used and would be specific to the trajectory desired. No generalization would be used or required. If alternate trajectories are desired, an additional neural network would be trained specifically for that trajectory and would be called upon by a higher level of control.

Intelligent Control of Medical Therapies:

In this example, one might use a neural network to learn the innate intelligence of a biological system. The neural network could then control the medical therapy applied to the malfunctioning portion of the biological system to ensure a synergistic relationship with the therapy and the remaining intact, functioning biological system.

For example, a neural network might be used to control a kidney dialysis machine. A set of variables that uniquely describe a functioning kidney might consist of temporal measurements of both urine and blood output and chemistry that are representative descriptors of the dynamic function of a kidney. Measurements, at time t, can be mapped to clearance and filtration rates measured at time, $t+D_r$, to predict the needed clearance and filtration rates at the next step in time. Once a carefully chosen cross-section of training sets are created, the neural network could learn to predict the desired clearance and filtration rates to obtain a biologically desirable urine and blood make-up. Hence, the neural network could be used to control a dialysis machine to obtain the desired clearance and filtration rates given a "real-time" feedback of urine and blood make-up.

In another example, a neural network might be used to control the administration rate of drugs where the level requires careful control and where the need of the drag may vary with activity, diurnal cycles, etc. One example could be the use of a neural network to control the rate of insulin release to an individual with diabetes. One might assume that the individual's own hormonal and nervous control systems are intact and the deficiency only lies in the ability to manufacture insulin in response to blood sugar levels. One might obtain a cross-section of data from a random population of healthy individual without diabetes that would include measurements of time, blood sugar, insulin levels and any other variables that affect insulin requirements of the body. The neural network could then be trained, using this data, to predict the insulin levels desired in the blood for a given blood sugar, time of day, or any other pertinent variables previously determined. The neural network could then be sued to predict and control insulin release levels given a measurement of these same variables, real-time. Such a controller might be integrated with a time-release insulin delivery device. Neural networks can be used in the administration of medical therapies in situations where the need of the body change as a function of changing conditions in its internal and/or external environment and where careful control of the delivery of the therapy, above and beyond a set dosage at a set time, is needed and beneficial. Additionally, the use of the neural network to learn the biological system such that it can predict the body's needs, before-hand, can help avoid potential instabilities in the body's pharmaceuticals such as anticoagulants, wherein it may be difficult to stabilize the blood consistency over time and wherein significant deviations can lead to life-threatening complications.

In all of the examples given above, the technique of teaching a neural network another system's intelligence, whether it be the intelligence of a biological system, a computer, a robot, etc., the ability to control processes and generalize and accurately predict next actions is directly linked to the careful choice of variables to map and the cross-section of training sets used. Firstly, knowledge of what determines how a system will behave and what measurements can be made to represent the system is necessary. A complete understanding of how a system behaves, is needed only to the extent of identifying the appropriate descriptors. Mathematical techniques such as linear regression analysis of all possible cause-and-effect variables to identity key descriptors for mapping may aid this process. Once these key descriptors are defined, the technique of nondimensional analysis might be applied to further "digest" these variables into less, yet more meaningful data with which to most efficiently train the neural network.

The above examples are given for explanation purposes only. Of course this same methodology can be expanded to include different or additional input parameters or features and functions thereof, modified to include other neural network methods besides back-propagation (to enhance generalization from the learning sets to more complex objects), adapted to use different neural network architectures, enhanced to include higher level control for object typing, etc. while remaining within the envelope of the inventor's disclosure intentions. Furthermore, the method of training (whether via a master or a simulation and whether via a binary or scalar encoding) is not limited to that described within. Also, the number of sensors and type to accomplish the same objective of this disclosure are limited only to the user's imagination. For example, traditional proximity sensors might be replaced with fiber optics, or some other mode or method of proximity sensing may be employed. Of course, networks can be added to map the relationship between angular position desired for each joint and the subsequent motor commands to achieve them.

I claim:

1. A method for neural network control of a time-varying process, said time-varying process having an input variable capable of affecting an operating state of said time-varying process and an output variable indicative of said operating state of said time-varying process, said method comprising the steps of:
   a) training a neural network controller by the steps of:
      i) simulating said time-varying process and recording said input variable as a function of time and recording said output variable as a function of time to create a data set, said data set including input variable data and output variable data as a function of time;
      ii) creating a training set from said data set by dividing said data set into increments of time and shifting the output variable data out of phase with the input variable data so that the output variable data lag at least one time increment behind the input variable data; and
      iii) presenting said training set to said neural network controller so that said neural network controller learns a correlating relationship between said output variable and said input variable based on said training set;
   b) subsequently controlling said time-varying process by the steps of:
      j) receiving said output variable from said time-varying process as a feedback signal in said neural network controller;
      jj) creating a control signal based on said feedback signal in accordance with said correlating relationship learned by said neural network controller from said training set; and
      jjj) receiving said control signal from said neural network controller as the input variable of said time-varying process.

2. The method of claim 1 further comprising the steps of:
   k) recording the input variable as a function of time and recording the output variable as a function of time during the operation of said time-varying process to create a supplemental data set, said supplemental data set including supplemental input variable data and supplemental output variable data as a function of time;
   kk) creating a supplemental training set from said supplemental data set by dividing said supplemental data set into increments of time and shifting the supplemental output variable data out of phase with the supplemental input variable data so that the supplemental output variable data lag at least one time increment behind the supplemental input variable data; and
   kkk) modifying said correlating relationship by presenting said supplemental training set to said neural network controller so that said neural network controller learns a modified correlating relationship between said output variable and said input variable based on said supplemental training set combined with said training set.

3. The method of claim 1, wherein:
   step i) comprises simulating a time-varying process representing an operation of a machine, said input variable being capable of affecting an operating state of said machine, said output variable being indicative of said operating state of said machine, and recording said input variable as a function of time and recording said output variable as a function of time to create a data set, said data set including input variable data and output variable data as a function of time;
   step j) comprises receiving said output variable from said machine as a feedback signal in said neural network controller; and
   step jjj) comprises receiving said control signal from said neural network controller as the input variable of said machine.

4. The method of claim 1, wherein:
   step i) comprises simulating a time-varying process representing a movement of a machine, said input variable being capable of affecting a position of said machine, said output variable being indicative of said position of said machine, and recording said input variable as a function of time and recording said output variable as a function of time to create a data set, said data set including input variable data and output variable data as a function of time;

step j) comprises receiving said output variable from said machine as a feedback signal in said neural network controller; and step jjj) comprises receiving said control signal from said neural network controller as the input variable of said machine.

5. The method of claim 4 wherein step i) comprises simulating said movement of said machine by manually controlling said machine through said movement and recording said input variable as a function of time and recording said output variable as a function of time throughout said movement to create a data set.

6. The method of claim 1 wherein step i) includes the substep of simulating said time-varying process by operating a simulation means to produce simulated input variable data as a function of time to be recorded as said input variable data as a function of time and to produce simulated output variable data as a function of time to be recorded as said output variable data as a function of time.

7. A method for neural network control of a time-varying process, said time-varying process having an input variable capable of affecting an operating state of said time-varying process and an output variable indicative of said operating state of said time-varying process, said method comprising the steps of:

a) training a neural network controller by the steps of:
   i) simulating said time-varying process and recording said input variable as a function of time and recording said output variable as a function of time to create a data set, said data set including input variable data and output variable data as a function of time;
   ii) creating a training set from said data set by dividing said data set into increments of time and shifting the output variable data out of phase with the input variable data so that the output variable data lag at least one time increment behind the input variable data; and
   iii) presenting said training set to an input layer of said neural network controller so that a hidden layer of said neural network controller learns a correlating relationship between said output variable and said input variable based on said training set within;

b) subsequently controlling said time-varying process by the steps of:
   j) receiving said output variable from said time-varying process as a feedback signal in said input layer of said neural network controller;
   jj) creating a control signal based on said feedback signal in accordance with said correlating relationship learned by said hidden layer of said neural network controller from said training set; and
   jjj) receiving said control signal from an output layer of said neural network controller as the input variable of said time-varying process.

8. The method of claim 7 wherein step iii) further includes the substep of assigning a value to each of a plurality of connections between said input layer and said hidden layer, and assigning a value to each of a plurality of connections between said hidden layer and said output layer through back-propagation methods based upon said training set.

9. The method of claim 7, wherein:

step i) comprises simulating a time-varying process representing an operation of a machine, said input variable being capable of affecting an operating state of said machine, said output variable being indicative of said operating state of said machine, and recording said input variable as a function of time and recording said output variable as a function of time to create a data set, said data set including input variable data and output variable data as a function of time;

step j) comprises receiving said output variable from said machine as a feedback signal in said neural network controller; and step jjj) comprises receiving said control signal from said neural network controller as the input variable of said machine.

10. The method of claim 7, wherein:

step i) comprises simulating a time-varying process representing a movement of a machine, said input variable being capable of affecting a position of said machine, said output variable being indicative of said position of said machine, and recording said input variable as a function of time and recording said output variable as a function of time to create a data set, said data set including input variable data and output variable data as a function of time;

step j) comprises receiving said output variable from said machine as a feedback signal in said neural network controller; and step jjj) comprises receiving said control signal from said neural network controller as the input variable of said machine.

11. The method of claim 10 wherein step i) comprises simulating said movement of said machine by manually controlling said machine through said movement and recording said input variable as a function of time and recording said output variable as a function of time throughout said movement to create a data set.

12. The method of claim 7 wherein step i) includes the substep of simulating said time-varying process by operating a simulation means to produce simulated input variable data as a function of time to be recorded as said input variable data as a function of time and to produce simulated output variable data as a function of time to be recorded as said output variable data as a function of time.

13. A method for neural network motion control of a robotic end effector, said robotic end effector having an input variable capable of affecting a position of said robotic end effector and an output variable indicative of an operating state of said robotic end effector, said method comprising the steps of:

a) training a neural network controller by the steps of:
   i) simulating a movement of said robotic end effector and recording said input variable as a function of time and recording said output variable as a function of time to create a data set, said data set including input variable data and output variable data as a function of time;
   ii) creating a training set from said data set by dividing said data set into increments of time and shifting the output variable data out of phase with the input variable data so that the output variable data lag at least one time increment behind the input variable data; and
   iii) presenting said training set to said neural network controller so that said neural network controller learns a correlating relationship between said output variable and said input variable based on said training set;

b) subsequently controlling the motion of said robotic end effector by the steps of:
   j) receiving said output variable from said robotic end effector as a feedback signal in said neural network controller;
   jj) creating a control signal based on said feedback signal in accordance with said correlating relationship learned by said neural network controller from said training set; and
   jjj) receiving said control signal from said neural network controller as the input variable of said robotic end effector.

14. The method of claim 13 wherein step i) comprises simulating said movement of said robotic end effector by manually controlling said robotic end effector through said movement and recording said input variable as a function of time and recording said output variable as a function of time throughout said movement to create a data set.

15. The method of claim 13 wherein step i) includes the substep of simulating said movement of said robotic end effector by operating a simulation means to produce simulated input variable data as a function of time to be recorded as said input variable data as a function of time and to produce simulated output variable data as a function of time to be recorded as said output variable data as a function of time.

16. A method for neural network control of a time-varying process, said time-varying process having an input variable capable of affecting an operating state of said time-varying process and a time indication variable, said method comprising the steps of:
   a) training a neural network controller by the steps of:
      i) simulating said time-varying process and recording said input variable as a function of time and recording said time indication variable as a function of time to create a data set, said data set including input variable data and time indication variable data as a function of time;
      ii) creating a training set from said data set by dividing said data set into increments of time and shifting the time indication variable data out of phase with the input variable data so that the time indication variable data lag at least one time increment behind the input variable data; and
      iii) presenting said training set to said neural network controller so that said neural network controller learns a correlating relationship between said time indication variable and said input variable based on said training set;
   b) subsequently controlling said time-varying process by the steps of:
      j) receiving said time indication variable from said time-varying process as a feedback signal in said neural network controller;
      jj) creating a control signal based on said feedback signal in accordance with said correlating relationship learned by said neural network controller from said training set; and
      jjj) receiving said control signal from said neural network controller as the input variable of said time-varying process.

17. The method of claim 15, wherein:
step i) comprises simulating a time-varying process representing a trajectory of a machine with said operating state representing a position of said machine; and
step b) comprises controlling the trajectory of said machine in accordance with said correlating relationship learned by said neural network controller.

* * * * *